United States Patent
Curtin

(10) Patent No.: US 8,584,581 B2
(45) Date of Patent: Nov. 19, 2013

(54) STRAIGHT PEELER

(75) Inventor: Heather Curtin, Duarte, CA (US)

(73) Assignee: Progressive International Corporation, Kent, WA (US)

(*) Notice: Subject to any disclaimer, the term of this patent is extended or adjusted under 35 U.S.C. 154(b) by 739 days.

(21) Appl. No.: 12/753,765

(22) Filed: Apr. 2, 2010

(65) Prior Publication Data

US 2010/0269715 A1 Oct. 28, 2010

Related U.S. Application Data

(60) Provisional application No. 61/173,524, filed on Apr. 28, 2009.

(51) Int. Cl.
*A23N 7/00* (2006.01)
*A22B 5/16* (2006.01)

(52) U.S. Cl.
USPC ............ 99/588; 99/498; 99/503; 99/508; 99/528; 99/538; 30/123.5; 30/337; 30/40; 30/43.4; 30/491

(58) Field of Classification Search
USPC ............ 99/588, 498, 503, 508–513, 528, 99/538–540, 543, 545, 574–575, 584; 30/123.5, 337, 125, 40, 43.4, 50–51, 30/534–536, 541, 491, 156, 504, 517
See application file for complete search history.

(56) References Cited

U.S. PATENT DOCUMENTS

| | | | | |
|---|---|---|---|---|
| 1,583,715 A | * | 5/1926 | Houston | 30/331 |
| 2,685,733 A | | 8/1954 | Carter | |
| 3,621,899 A | * | 11/1971 | Hula | 30/280 |
| 4,020,555 A | * | 5/1977 | Hedrick | 30/392 |
| D247,870 S | | 5/1978 | Herrmeyer et al. | |
| D332,034 S | | 12/1992 | Viemeister | |
| 5,279,035 A | | 1/1994 | Cohen et al. | |
| 5,400,512 A | | 3/1995 | Brush | |
| 6,619,194 B1 | | 9/2003 | Kuan | |
| 6,837,133 B2 | | 1/2005 | Prommel et al. | |
| D509,711 S | | 9/2005 | Bennerdahl | |
| D509,712 S | | 9/2005 | Lee | |
| 7,185,436 B2 | | 3/2007 | Murphy et al. | |
| D586,190 S | | 2/2009 | Hauser | |
| 2006/0272161 A1 | * | 12/2006 | Di Bitonto et al. | 30/279.6 |

OTHER PUBLICATIONS

"The Perfect Peeler," Kyocera Ceramics, www.kyoceraadvancedceramics.com; 1 page. 2005.
"A Metamorphosis in Kitchenware," Good Cook, www.goodcook.com, 1 page. 2005.

* cited by examiner

*Primary Examiner* — Henry Yuen
*Assistant Examiner* — Ket D Dang
(74) *Attorney, Agent, or Firm* — Lowe Graham Jones PLLC

(57) ABSTRACT

The vegetable peeler for separating the peel from fruits and vegetables includes a handle, a tool head or blade mount, and a blade. The handle is configured to be able to receive and store at least one spare cutting blade such that the blade can be removed from the tool head and replaced with a different blade stored in the handle.

8 Claims, 5 Drawing Sheets

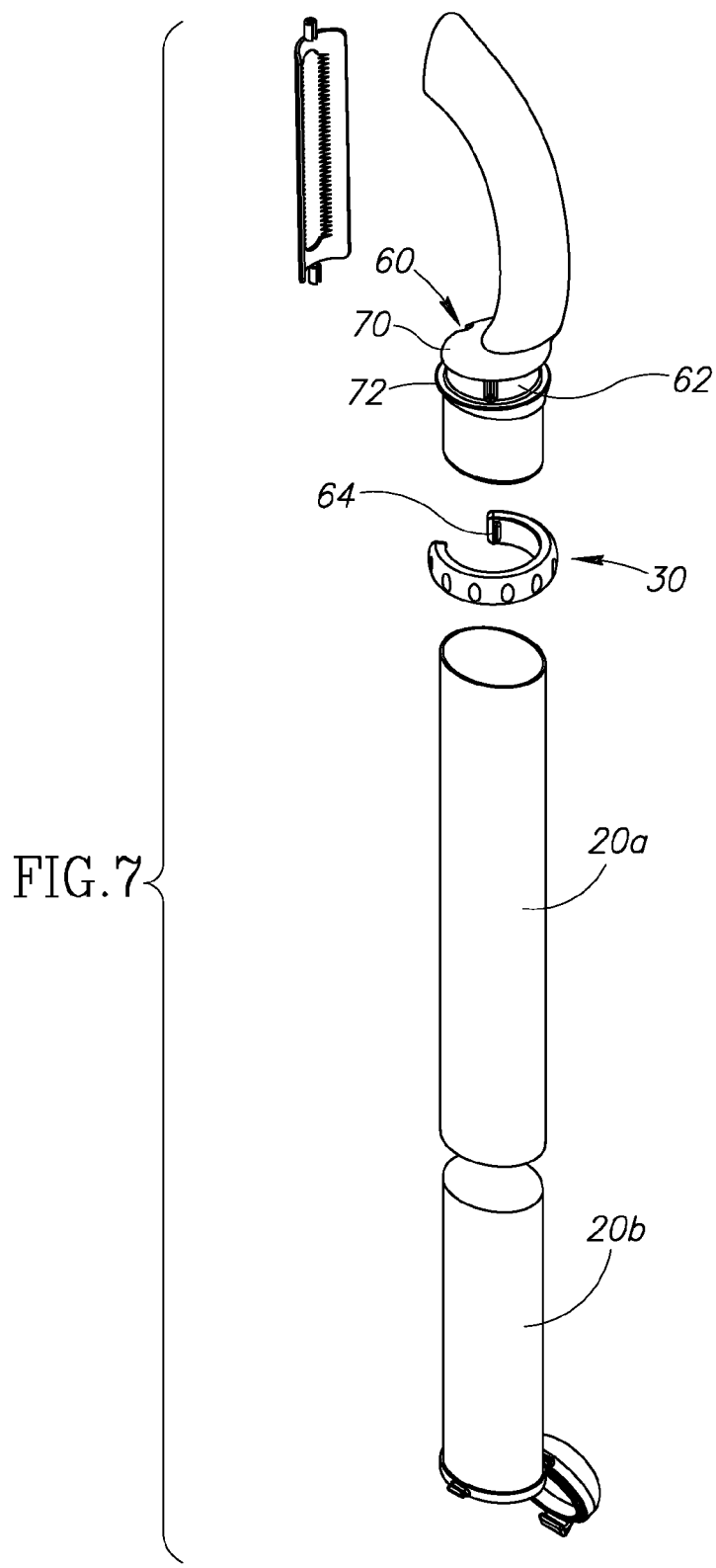

STRAIGHT PEELER

PRIORITY CLAIM

This application claims the benefit of prior provisional application Ser. No. 61/173,524 filed on Apr. 28, 2009.

FIELD OF THE INVENTION

This invention relates generally to kitchen tools for peeling fruits and vegetables.

BACKGROUND OF THE INVENTION

Peeling devices are commonly used for peeling fruits and vegetables such as apples, carrots, or potatoes. Some such peeling devices include a handle terminating in a working end having a blade that is axially aligned with or generally parallel to the handle. The blades for such devices are most often in the form of an elongated member having an internal opening with sharpened edges, in which the skin of the item to be peeled is cut by one of the sharpened opening edges, allowing the peel to pass through the internal opening. The sharpened blade edges may be straight, serrated, scalloped, or otherwise formed in order to produce a desired peel trimming or a desired effect on the fruit or vegetable meat after the peel is removed.

In order to use a different type of blade, however, a different peeler must be used. Current vegetable peelers do not allow for the possibility of replacing old dull blades or exchanging a serrated or scalloped blade for a straight blade.

SUMMARY OF THE INVENTION

A preferred vegetable peeler includes a handle and a tool head, with the tool head being configured to removably hold a blade. The blade may be formed in any of a variety of ways, including a standard straight peeling blade, a serrated or scalloped blade, or other configurations.

Although ideally suited for peeling vegetables, it should be understood that within this specification the term "vegetable" is intended to encompass fruits and other food items that can be peeled with such a device.

In some preferred versions the mechanism for holding the blade includes a central blade-retaining collar and a blade mount configured to hold the blade. The collar is rotatable to selectively allow the blade to be either secured or removed from the tool head.

The handle is preferably cylindrical in cross-sectional shape, and forms an internal cavity that is sized and configured to be able to receive and store at least one spare cutting blade.

In other versions the handle is formed in a square, polygonal, or other cross-sectional shape that is configured to receive and retain replacement blades.

BRIEF DESCRIPTION OF THE DRAWINGS

Preferred and alternative examples of the present invention are described in detail below with reference to the following drawings:

FIG. 7 is an exploded view of a preferred vegetable peeler in accordance with the invention.

DETAILED DESCRIPTION OF THE PREFERRED EMBODIMENT

Figure 1:
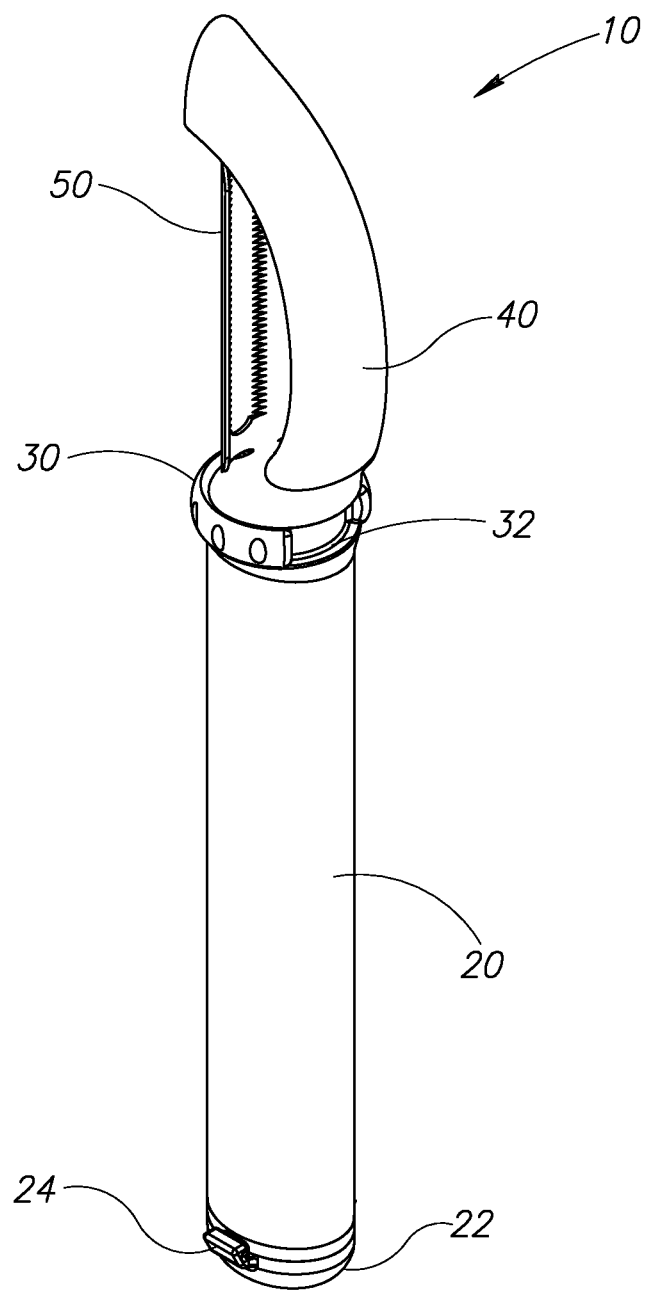
FIG. 1 is a perspective view of a preferred vegetable peeler in accordance with the invention.
Figure 2:
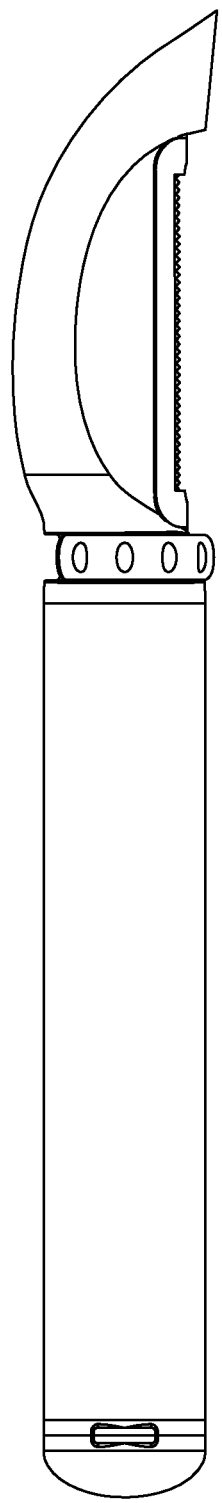
FIG. 2 is a side view of a preferred vegetable peeler in accordance with the invention.
Figure 3:
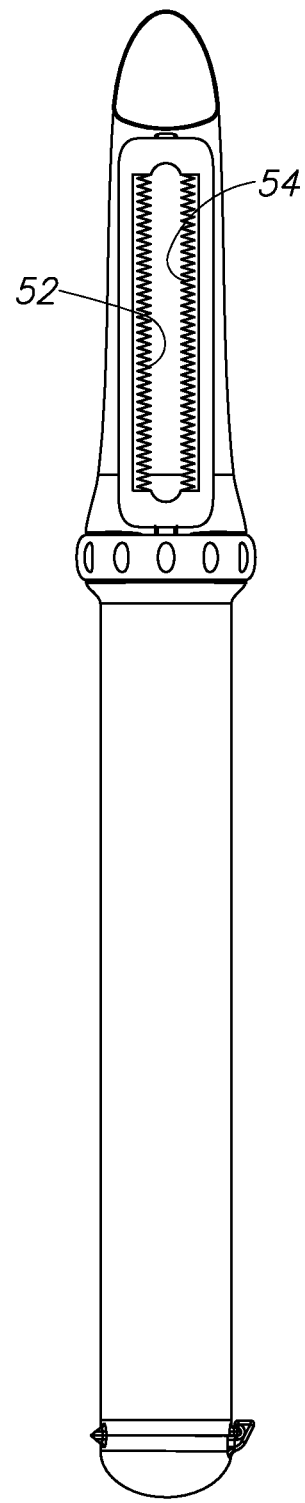
FIG. 3 is a front view of a preferred vegetable peeler in accordance with the invention.
Figure 4:
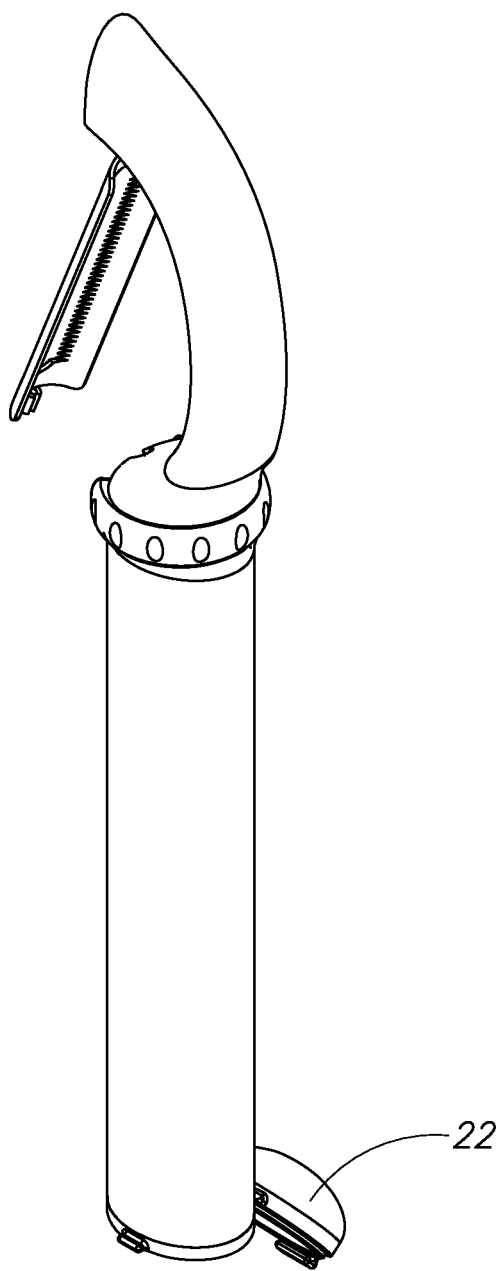
FIG. 4 is a perspective view of a preferred vegetable peeler in accordance with the invention, shown with a blade pivoted forward.
Figure 5:
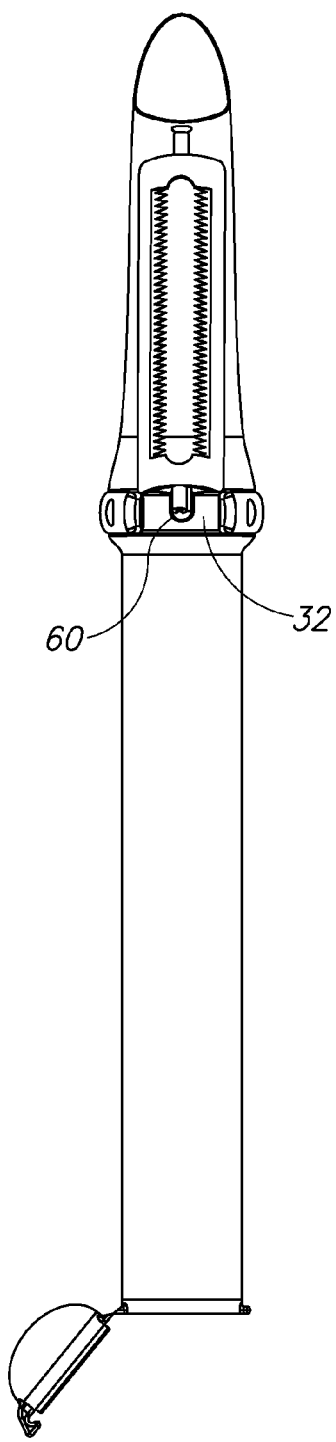
FIG. 5 is a front view of a preferred vegetable peeler in accordance with the invention, shown with a blade pivoted forward.

The preferred peeler 10 includes a handle 20, a central blade-retaining collar 30, and a tool head or blade mount 40 configured to hold a blade 50. The handle 20 is preferably cylindrical in cross-sectional shape, and forms an internal cavity that is sized and configured to be able to receive and store at least one spare cutting blade, as discussed further below. The handle need not be cylindrical, and in other versions the handle is formed in a square, polygonal, or other cross-sectional shape. Most preferably, however, the handle is configured to be able to receive and retain one or more cutting blades. The handle need not hold the blades entirely in an encapsulated fashion, though the blades may be stored in the handle in a fully encapsulated manner in the preferred version of the invention.

The handle 20 includes a proximal end relatively adjacent the tool head and a distal end opposite the proximal end. The distal end of the handle terminates in an end cap 22, with the end cap providing a removable seal to retain a spare blade within the handle. The handle may be formed as a single integral unit, or may be formed in two or more sections 20a, 20b (best seen in FIG. 7), joined together by glue, sonic welding, or other means of fastening.

In the illustrated version, the end cap 22 is permanently secured to the handle 20 via a living hinge 24, such that the handle and end cap are integrally formed from plastic to ensure that the end cap is always attached to the handle. In this fashion, the end cap can pivot to an open position via the living hinge to allow access to the internal cavity and spare blade, then can pivot to a closed position in which it seals the cavity to retain the spare blade. As shown, the end cap includes either a snap fit or a frictional fit to secure the end cap to the handle in a closed position.

In other versions of the invention, the living hinge may be omitted. In such versions, the end cap may secure to the handle in a friction-fit or snap-fit arrangement as discussed above. Alternatively, the end cap may fasten to the handle in a threaded arrangement or in any other manner capable of generally enclosing the cavity to retain the spare blade. Though plastic is used in the preferred version as discussed above, metal or other materials may be used in other versions of the invention.

The proximal end of the handle (that is, the end opposite the distal end that includes the end cap) transitions to a tool head or blade mount 40. The blade mount is preferably formed as an arc that extends from the proximal end of the handle to the tip of the working end of the peeler. The arc-shaped blade mount is configured to hold the blade 50, securing a first end of the blade adjacent the proximal end of the handle and a second end of the blade adjacent the tip of the working end of the peeler. In the preferred version of the invention, the handle and blade mount are integrally molded from plastic.

The blade 50 is generally elongate in shape and includes opposing, inwardly-facing cutting surfaces 52, 54 having a space between them to allow for peelings to pass through. The cutting surfaces may be simple sharpened linear edges, or may, alternatively, include serrations, scallops, or a plurality of orthogonal cutting blades to separate peelings into julienne pieces. In other versions, additional variations of blade configurations may be used.

The blade 50 includes a pair of pins 56, 58 at each of the opposite ends. In one version, the blade and pins are integrally formed from a single piece of material such as plastic or metal. Alternatively, the pins may be formed separately and then welded or otherwise bonded onto the blade. In still other versions, the pins maybe attached to the blade in a manner that allows for pivotal movement of the blade with respect to the pins.

Figure 6:
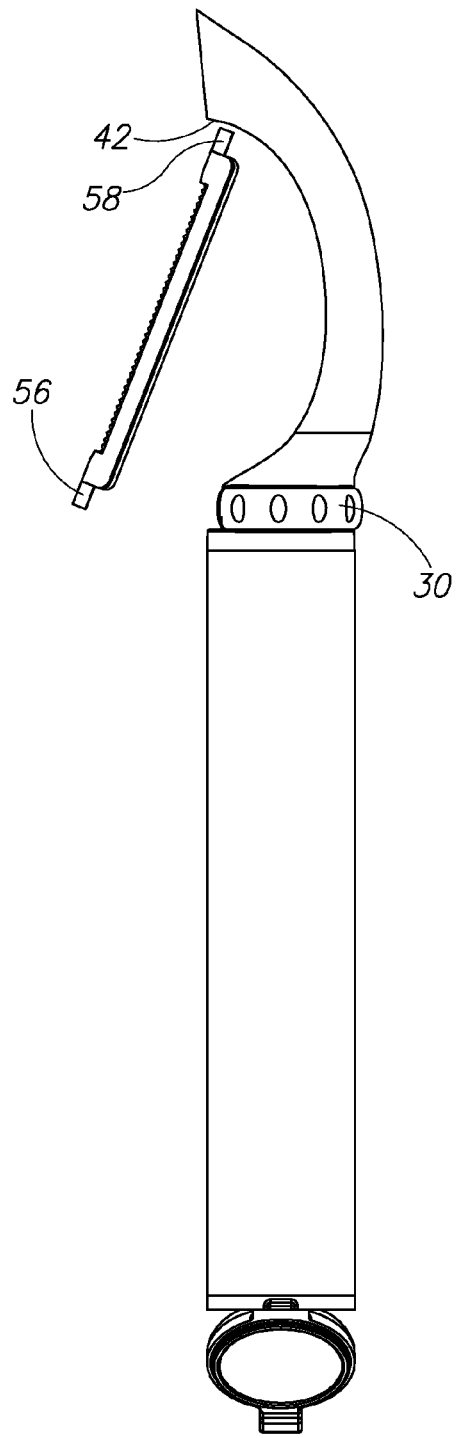
FIG. 6 is a side view of a preferred vegetable peeler in accordance with the invention, shown with a blade pivoted forward.

The tip of the blade mount includes an upper well 42 that is configured to receive one of the pins 56 carried on the blade. In the illustrated version of the invention, the upper well is a cavity formed in the distal end of the tool head, with the cavity being sized and shaped to snugly receive the pin. From the perspective of the tool illustrated in FIG. 6, the upper well 42 extends substantially vertically into the tool head. The other of the two pins 58 is received within a lower well 60 and retained by the collar 30. The collar is secured to the handle at the juncture of the handle and the blade mount, with the collar being configured for rotational movement about the handle. The collar includes an opening 32, with the opening being somewhat larger than the pin 58 so that the pin can pass through the opening. When the collar 30 is rotated into a first position such that the opening 32 of the collar is aligned with the lower well 60 and aligned below the upper well 42, the lower pin 58 of the blade is accessible and can pass through the collar and either into or out of the lower well. This allows the blade to be rotated outward, away from the blade mount, so that the blade can be removed entirely from the blade mount.

When the blade is inserted into the blade mount, with the first pin 56 within the upper well 42 and the second pin 58 within the lower well 60 and adjacent the collar, the collar can be rotated to move the opening toward the back of the peeler (that is, approximately 180 degrees of rotation from the first position in which the blade can be removed). In this rotated position, the collar retains the second pin 58 between the collar and the handle mount, preventing the blade from falling out of the blade mount.

As best seen in FIG. 7, the collar is retained in position between an upper flange 70 and a lower flange 72, allowing the collar to pivot about the proximal end of the handle while being retained between the two flanges. The collar and the diameter of the handle between the two flanges are preferably formed to create a somewhat snug fit of the collar about the handle. A plurality of projections formed about the external surface of the collar are provided to improve the ability to grip the collar for rotation as desired.

The collar is formed as a C-shape, with each end of the C terminating in a tooth 64. Each of the teeth 64 mates with a corresponding depression 62 formed in the base of the blade mount in the space between the upper and lower flanges in order to lock the collar in place and securely retain the blade. Thus, when the blade is in position with the pins received in the upper and lower wells, the collar is rotated such that the opening of the C shape is toward the back of the tool head. The teeth are received within the depressions to hold the collar in this position.

As desired, the blade 50 may be removed and replaced with a different blade. In order to remove a blade, the collar is rotated to position the opening 32 adjacent the lower blade pin 58. This allows the blade to be rotated forward and removed from the blade mount. The end cap is opened or removed from the handle, exposing the internal handle cavity and allowing a user to remove a stored blade. The stored blade is then positioned within the handle mount in the manner discussed above, and the collar is rotated to securely hold the blade in place. The removed blade can be placed inside the handle for convenient storage, with the end cap retaining the stored blade in place.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device for separating the peel from fruits or vegetables, comprising:
   a handle having a distal end and a proximal end, the handle having an exterior surface and an interior surface defining an internal cavity;
   a blade mount adjacent the proximal end of the handle, the blade mount having an upper well at a first end of the blade mount and a lower well at a second end of the blade mount;
   a first blade removably secured to the blade mount, the first blade having a first pin extending from a first end of the first blade, and a second pin extending from a second end of the first blade, the first pin being received within the upper well and the second pin being received within the lower well;
   a collar rotatably mounted on the device, the collar having an opening sized to allow the second pin to pass through the opening, the collar being rotatable to a first position in which the opening is aligned with the lower well and a second position in which the opening is positioned away from the lower well, whereby the second pin is retained within the lower well when the collar is rotated to the second position and the second pin is removable from the lower well when the collar is rotated to the first position;
   an upper flange being formed at a juncture of the blade mount and the proximal end of the handle and a lower flange spaced apart from the upper flange, the collar being retained in a channel formed between the upper flange and the lower flange;
   a tooth being integrally formed on the collar and extending toward an interior side of the collar, the tooth being receivable within a corresponding slot formed in the channel;
   wherein the first blade and the internal cavity of the handle are sized and configured such that when the first blade is removed from the blade mount it is receivable within the internal cavity.

2. The device of claim 1, further comprising an end cap attached to the distal end of the handle, the end cap enclosing the internal cavity.

3. The device of claim 2, wherein the end cap is secured to the handle via a living hinge.

4. The device of claim 2, further comprising a second blade retained within the internal cavity.

5. A device for separating the peel from fruits or vegetables, comprising:

a handle having a distal end and a proximal end and extending longitudinally from the distal end to the proximal end, the handle having an internal cavity and a removable cap secured to the handle to selectively enclose the internal cavity;

a blade mount attached to the proximal end of the handle, the blade mount having a first recessed portion and a second recessed portion;

a first blade removably secured to the blade mount and extending longitudinally away from the proximal end of the handle, the first blade having a first end received in the first recessed portion and a second end received in the second recessed portion; and a C-shaped collar rotatably mounted on the device within an annular channel formed at a juncture of the blade mount and the proximal end of the handle, the C-shaped collar having an opening sized to allow the second end of the first blade to pass through the opening, the C-shaped collar being rotatable to a first position in which the opening is aligned with the second recessed portion and a second position in which the opening is moved away from the second recessed portion, whereby the second end of the first blade is retained in the second recessed portion when the collar is rotated to the second position and the second end of the first blade is removable from the second recessed portion when the collar is rotated to the first position;

wherein the first blade and the internal cavity of the handle are sized and configured such that when the first blade is removed from the blade mount it is receivable within the internal cavity.

6. The device of claim 5, wherein the collar comprises a tooth extending toward an interior of the collar, the tooth being receivable within a corresponding slot formed in the channel.

7. The device of claim 5, wherein the removable cap is secured to the handle via a living hinge.

8. The device of claim 7, further comprising a second blade retained within the internal cavity.

* * * * *